United States Patent
Klosterman

(10) Patent No.: US 6,330,764 B1
(45) Date of Patent: Dec. 18, 2001

(54) DOOR WINDOW MOUNTING AND REGULATOR ASSEMBLY AND METHOD FOR ASSEMBLY

(76) Inventor: Larry G. Klosterman, 36718 Thomas Dr., Sterling Heights, MI (US) 48312

( * ) Notice: Subject to any disclaimer, the term of this patent is extended or adjusted under 35 U.S.C. 154(b) by 0 days.

(21) Appl. No.: 09/444,229

(22) Filed: Nov. 19, 1999

(51) Int. Cl.⁷ .................................................. B60J 1/00
(52) U.S. Cl. ................................................ 49/375; 49/506
(58) Field of Search ............................. 49/374, 375, 348, 49/349, 350, 351, 506

(56) References Cited

U.S. PATENT DOCUMENTS

| | | |
|---|---|---|
| 3,888,044 | 6/1975 | Lystad . |
| 3,897,653 | 8/1975 | Hayden et al. . |
| 4,026,088 | 5/1977 | Akabane . |
| 4,051,632 | 10/1977 | Fukumoto et al. . |
| 4,183,178 | 1/1980 | Kiefer et al. . |
| 4,449,326 | 5/1984 | Hori et al. . |
| 4,586,290 | 5/1986 | Juechter . |
| 4,606,159 | 8/1986 | Kunert . |
| 4,663,901 | 5/1987 | Ichinohe . |
| 4,762,904 | 8/1988 | Nakama . |
| 4,776,132 | 10/1988 | Gold . |
| 4,777,766 | 10/1988 | Johnson et al. . |
| 4,811,519 | 3/1989 | Gold . |
| 4,986,030 | 1/1991 | Bertolini et al. . |
| 4,987,699 | 1/1991 | Gold . |
| 5,036,621 | 8/1991 | Iwasaki . |
| 5,050,348 | 9/1991 | Kane et al. . |
| 5,113,620 | 5/1992 | Guillaume et al. . |
| 5,199,217 | 4/1993 | Roze . |
| 5,243,785 | 9/1993 | Nieboer et al. . |
| 5,341,599 | 8/1994 | Cox . |
| 5,363,595 | 11/1994 | Wirsing . |
| 5,469,663 | 11/1995 | TenBrink et al. . |
| 5,502,926 | 4/1996 | Grace et al. . |
| 5,513,468 | 5/1996 | Diestelmeier . |
| 5,515,651 | 5/1996 | Hofmann et al. . |
| 5,537,783 | 7/1996 | Kazino et al. . |
| 5,546,704 | 8/1996 | Maruoka . |
| 5,622,005 | 4/1997 | Ochenski et al. . |
| 5,692,273 | 12/1997 | Rodde . |
| 5,729,930 | 3/1998 | Schust et al. . |
| 5,765,310 | 6/1998 | Gold . |
| 5,778,599 | 7/1998 | Saito . |
| 5,848,496 | 12/1998 | Bertolini et al. . |
| 5,907,927 | 6/1999 | Lieb et al. . |
| 5,918,420 | 7/1999 | Timmermann . |
| 6,041,549 | * 3/2000 | Schust et al. ............... 49/375 |
| 6,119,403 | * 9/2000 | Klippert et al. ............ 49/375 |
| 6,131,339 | * 10/2000 | Ramus ....................... 49/375 |

* cited by examiner

*Primary Examiner*—Jerry Redman
(74) *Attorney, Agent, or Firm*—Vanophem & Vanophem, P.C.

(57) ABSTRACT

A door window mounting and regulator assembly and more particularly a door window assembly whereby an automotive window is firmly and fixedly removably retained in a mounting assembly and method for the assembly thereof. This door window mounting and regulator assembly includes a base member with a pair of clevis brackets mounted thereon. A retainer bracket pivotally attaches within each clevis bracket and includes an undercut area that cooperates with one of a pair of contoured portions of a door window to firmly, fixedly, and removably permanently retain the door window within the door window mounting and regulator assembly.

22 Claims, 3 Drawing Sheets

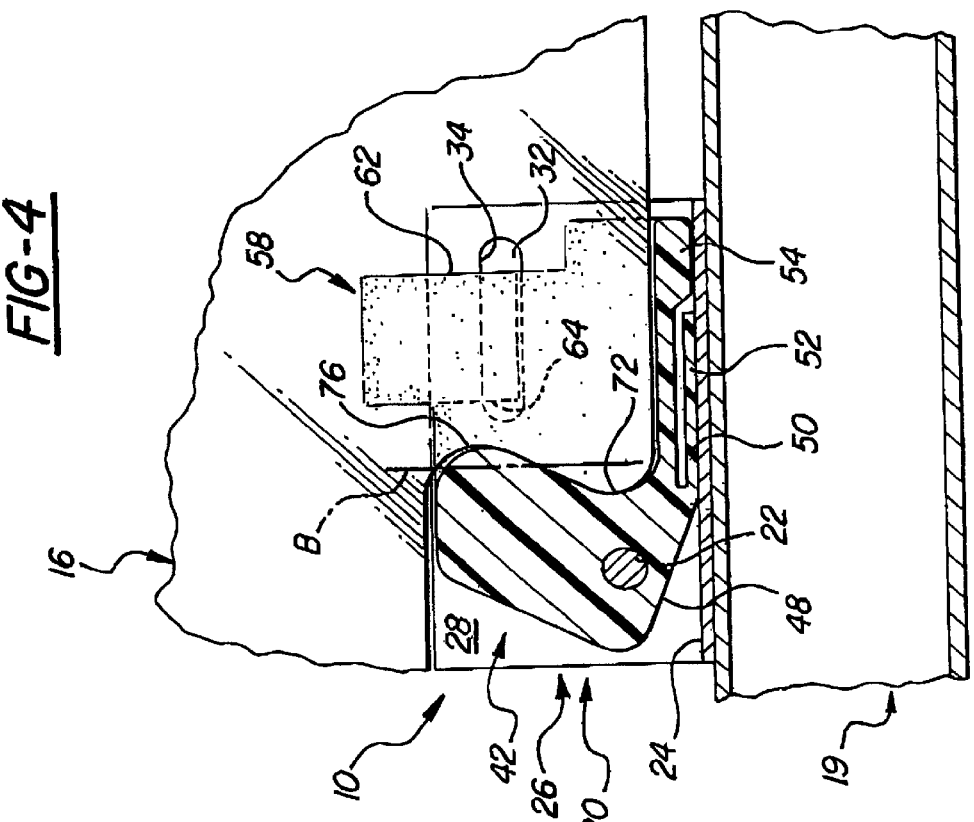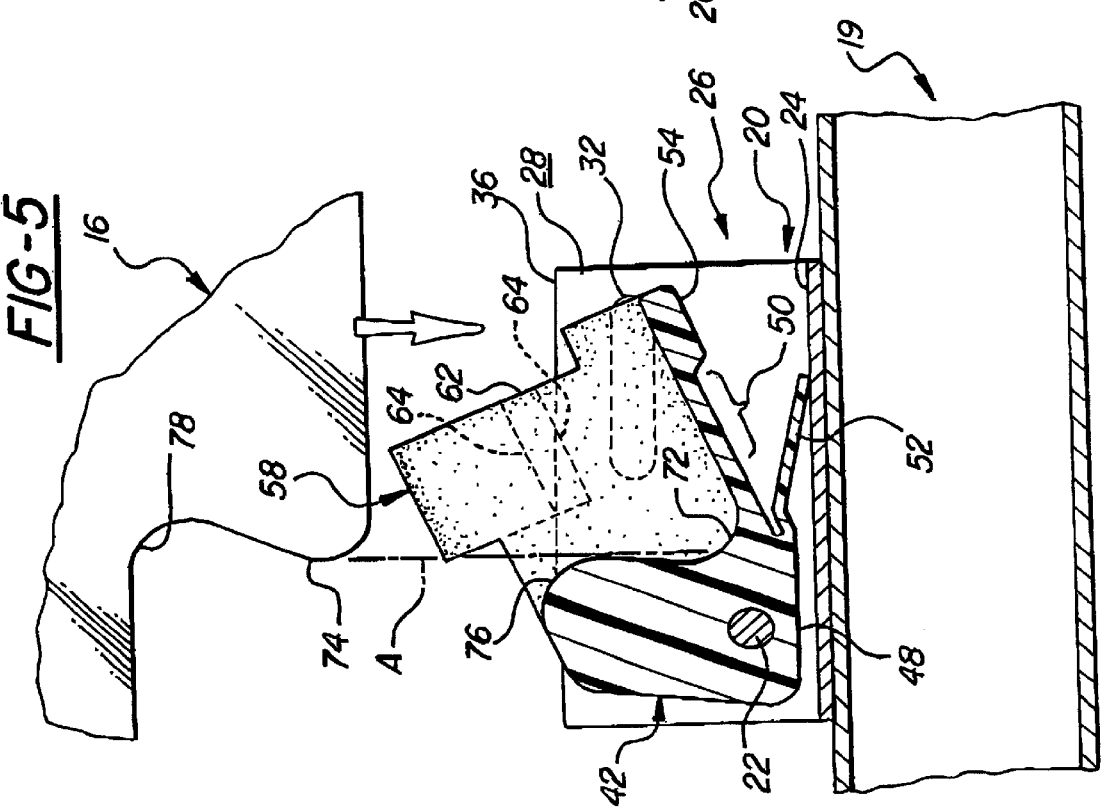

DOOR WINDOW MOUNTING AND REGULATOR ASSEMBLY AND METHOD FOR ASSEMBLY

BACKGROUND OF THE INVENTION

1. Field of the Invention

The present invention relates generally to a door window mounting and regulator assembly and more particularly to a door window assembly whereby an automotive window is firmly and fixedly removably retained in a mounting assembly and a method for the assembly thereof.

2. Description of the Prior Art

Automotive vehicles are commonly equipped with door window mounting and regulator assemblies capable of being elevated from and lowered into a door cavity by a window mechanism. The mechanism, which elevates the window, coupled with the motion of the vehicle presented a problem of stability with respect to the door window. The prior art recognized this problem and partially eliminated it by using stabilizing components in conjunction with the window assembly. U.S. Pat. No. 3,888,044 to Lystad teaches the use of a linkage and a sash plate connected to a window by a fastener that stabilize the position of the window in the raised position and fold in half as the window is lowered. U.S. Pat. No. 3,897,653 to Hayden et al. teaches the use of a stabilizer system utilizing spaced vertical guide rods and an interlocking sliding engagement with a channel support secured to a window panel. U.S. Pat. No. 4,051,632 to Fukumoto et al. teaches the use of a support bracket carrying a guide follower that permits lateral adjustment of a window glass with respect to a door panel only through actuation of an adjusting screw. U.S. Pat. No. 4,449,326 to Hori et al. teaches the use of a drive member that slidably passes through a guide track member and U.S. Pat. No. 4,586,290 to Juechter teaches the use of a stabilizer strut to stabilize a door window laterally in a fully raised position.

None of these prior art solutions to stability considerations, however, addresses the issue of firmly retaining the door glass in a fixed position within the door window mounting and regulator assembly.

Later variations of mounting assemblies attempted to obviate the aforementioned problems. In these prior art inventions, various devices were used to connect the door glass to the sash or mounting assembly. U.S. Pat. No. 4,183,178 to Kiefer et al. teaches the use of a resilient retainer device for quick window adjustments. U.S. Pat. No. 4,777,766 to Johnson et al. teaches the use of rivets to connect opposite ends of a sash with an inboard surface of a glass. U.S. Pat. No. 4,986,030 to Bertolini et al. teaches the use of a coupling device and grippers to attach various components within the assembly. U.S. Pat. No. 5,036,621 to Iwasaki teaches the use of a sliding member attached by rivets to a window glass. U.S. Pat. No. 5,050,348 to Kane et al. and 5,243,785 to Neiboer et al. teach the use of window glass attached to various devices with rubber gaskets and brackets. U.S. Pat. No. 5,113,620 to Guillaume et al. teaches the use of window glass attachments via tabs and brackets; and U.S. Pat. No. 5,199,217 to Roze teaches the use of a window glass attached to a preformed plastic interlocking connection piece. U.S. Pat. No. 5,692,273 to Rodde teaches the use of gripping jaws to retain the window glass. Finally, U.S. Pat. No. 5,848,496 to Bertolini et al. teaches the use of lugs to clamp a window glass in place.

Although the teachings of those inventions partially addressed the inability of the prior art to properly position and permanently affix the window glass to the mounting assembly, the proposed solutions were not entirely successful. Various drawbacks encountered in the prior art included the following: first, the inability to consistently manufacture the retention devices within close tolerances. The tolerance range of the retention devices often resulted in an inability to fixedly retain a window glass within an assembly. The inability to fixedly retain the window glass caused vibrations and rattles of the window, and such conditions were unacceptable to vehicle operators. Second, some retention devices loosened after assembly, partially or completely preventing movement of the window glass within a door cavity of a vehicle. Finally, the assembly process utilizing various prior art retention devices required complex and costly procedures.

A number of inventions partially addressed the issues of proper position and permanent retention through the use of various adhesives. U.S. Pat. No. 4,026,088 to Akabane teaches the use of a holder and an adhesive to retain a door window glass within a mounting assembly. U.S. Pat. No. 4,606,159 to Kunert teaches the use of mounting strips that are bent around a window glass to lock a glass pane into position until an adhesive substance affixing the glass pane to an assembly completely hardens. U.S. Pat. No. 4,663,901 to Ichinohe teaches the use of an unhardened adhesive and an anti-flow member for retention purposes. U.S. Pat. No. 4,762,904 to Nakama teaches the use of adhesive-filling grooves and adhesives to attach a window glass to a regulator assembly. U.S. Pat. No. 4,776,132 to Gold teaches the use of cooperating tabs and notches in a door window; and, in one embodiment, an adhesive bead to affix the window glass to a mounting assembly. U.S. Pat. No. 4,811,519 to Gold teaches the use of a window receiving element and an adhesive used to retain a window glass within an assembly. U.S. Pat. No. 4,987,699 to Gold teaches the use of leg members with openings for receiving an adhesive that attaches a window glass thereto. U.S. Pat. No. 5,469,663 to TenBrink et al. teaches the use of a glider block, spring clips, and a bonding composite for attaching a window glass to an assembly. U.S. Pat. No. 5,513,468 to Diestelmeier teaches the use of brackets and an adhesive to secure a window glass within an assembly. U.S. Pat. No. 5,765,310 to Gold teaches the use of a retainer and a curable adhesive for window attachment. Finally, U.S. Pat. No. 5,918,420 to Timmermann teaches the use of a holding element adhesively bonded to a window.

The use of adhesives, however, presented a number of new problems. First, the door window glass tended to shift out of position under the force of its own weight during the drying process of the adhesive. Second, the frictional force of the window regulator on the adhesive and the mounting assembly often caused delamination of the adhesive, resulting in disengagement of the door window glass from the assembly. Third, the material composition and lamination of some door safety windows, such as those containing cellulose nitrate, resulted in extreme brittleness. This composition further complicated the attachment of the window door glass to the mounting assembly with the use of adhesives, and increased the costs of production, maintenance, and replacement associated therewith.

Later improvements attempted to obviate the problems associated with the device and adhesive attachment systems by using various mechanical attachments. In each invention, the various mechanical attachments utilized a hole bored through a door window glass for attachment purposes. U.S. Pat. No. 5,341,599 to Cox teaches the use of a nylon washer snapping into a hole of a window glass for attachment purposes. U.S. Pat. No. 5,363,595 to Wirsing teaches the use of a guide block with an alignment aperture for a snap fit connection through a hole in a window. U.S. Pat. No. 5,502,926 to Grace teaches the use of a plastic disc-cap encasing a T-nut fixedly attaching a window glass through a hole therein. U.S. Pat. No. 5,515,651 to Hofmann et al., U.S. Pat. No. 5,537,783 to Kazino et al., and U.S. Pat. No. 5,546,704 to Maruoka teach the use of an attachment element connecting through a hole in a window glass. U.S. Pat. No. 5,622,005 to Ochenski et al. teaches the use of a fastener permanently affixing a window to a shoe via a hole in the window glass. U.S. Pat. No. 5,729,930 to Schust et al. teaches the use of expandable insertion parts attaching a window to a retainer via a hole in a window glass. U.S. Pat. No. 5,778,599 to Saito teaches the use of a retainer that snaps into a hole in the window. Finally, U.S. Pat. No. 5,907,927 to Lieb et al. teaches the use of a channel retainer for mounting a window glass, wherein a hole may be utilized.

The aforementioned prior art teachings that relied on a hole in a window glass for attachment to a mounting assembly addressed some of the problems associated with the use of adhesives. Conversely, new problems arose. The process of boring the hole in the window glass resulted in a disproportionately high rate of window breakage during the boring process. This breakage resulted in substantially increased costs. Further, the boring process and the hole in the window caused degradation of the structural integrity of the window.

Finally, for maintenance reasons and the like, door window mounting assemblies of the prior art required prolonged, complex, and costly methods for the removal or replacement of the door window glass from the assembly.

What is needed, therefore, is a door window glass mounting and regulator assembly that firmly, fixedly, and permanently retains a door window glass within the door window mounting and regulator assembly and maintains the structural integrity of the door window glass and door window mounting and regulator assembly. Additionally, a need exists for a simple, efficient, cost-effective method of assembling the door window glass within the regulator and mounting assembly and removal of the door window glass therefrom.

SUMMARY OF THE INVENTION

The present invention provides a door window mounting and regulator assembly that firmly, fixedly, and permanently retains the door window glass within a door window mounting and regulator assembly and maintains the structural integrity of the door window assembly throughout the life cycle of the vehicle. The present invention also provides a method for simply, quickly, and inexpensively mounting a door window glass within a door window mounting and regulator assembly. Additionally, the present invention provides a simple method for removal or replacement of door window glass from a door window mounting and regulator assembly for service purposes.

The door window mounting and regulator assembly attaches to an elevating or sash member of a window regulator that elevates and lowers a door window glass. The door window mounting and regulator assembly has a base member with a pair of clevis brackets mounted thereon. Each clevis bracket includes a retainer bracket pivotally connected thereto. In an open position, the pair of retainer brackets receives a door window glass. In a closed position, the pair of retainer brackets removably lock to the clevis brackets, retaining the door window glass in a fixed position within the window mounting assembly.

Thus, when the retainer brackets are in the open position, as described above, the door window may be assembled within the door window mounting and regulator assembly via a one-step process. In this process, the door window glass inserts into the retainer brackets and, under the force of insertion, the retainer brackets pivot to the closed position, thereby entrapping the window glass. At the end of their travel, the retainer brackets snap into a locked position within the levis brackets, thereby permanently, firmly, and fixedly retaining the door window glass within the door window mounting and regulator assembly.

The present invention also provides a door window mounting and regulator assembly that holds the door window glass in a permanently fixed position within the door window mounting and regulator assembly. Additionally, the present invention provides a method for simply, quickly, and inexpensively mounting the door window glass within the door window mounting and regulator assembly or removing the door window glass therefrom for service purposes.

Accordingly, it is an object of the present invention to provide a door window mounting and regulator assembly that facilitates a simple, fast assembly process for fixedly positioning and attaching a door window glass to the assembly.

It is another object of the present invention to provide a door window mounting and regulator assembly that minimizes the costs associated with the process of mounting a door window glass within a window regulator assembly.

It is yet another object of the present invention to provide a door window mounting and regulator assembly that permanently retains a door window glass mounted within a door window mounting and regulator assembly and readily permits removal of the door window glass from the same.

A still further object of the present invention is to minimize the costs associated with assembly, maintenance, and replacement of the door window glass within the mounting assembly.

It is yet another object of the present invention to provide a door window mounting and regulator assembly and method thereof that minimizes the occurrence of window glass breakage.

It is a further object of the present invention to provide a door window mounting and regulator assembly that permits the structural integrity of the door window and the door window mounting and regulator assembly to be maintained.

It is also an object of the present invention to provide a fast, simple, inexpensive method for removal and replacement of the door window glass from the door window mounting and regulator assembly.

These objects and other features, aspects, and advantages of this invention will become apparent after a reading of the following detailed description, appended claims, and accompanying drawings.

BRIEF DESCRIPTION OF THE DRAWINGS

FIG. 4 is a partly cross-sectional view of the door window mounting and regulator assembly after installation of the door window glass taken along lines 4—4 of FIG. 3; and FIG. 5, similar to FIG. 4, is a partly cross-sectional view of the components of the door window mounting and regulator assembly in a position to receive the door window glass.

DETAILED DESCRIPTION OF THE PREFERRED EMBODIMENT

The present invention is directed to a door window assembly wherein an automotive window glass is firmly and fixedly removably mounted and retained in a door window mounting and regulator assembly, and a method for the assembly thereof.

Figure 1:
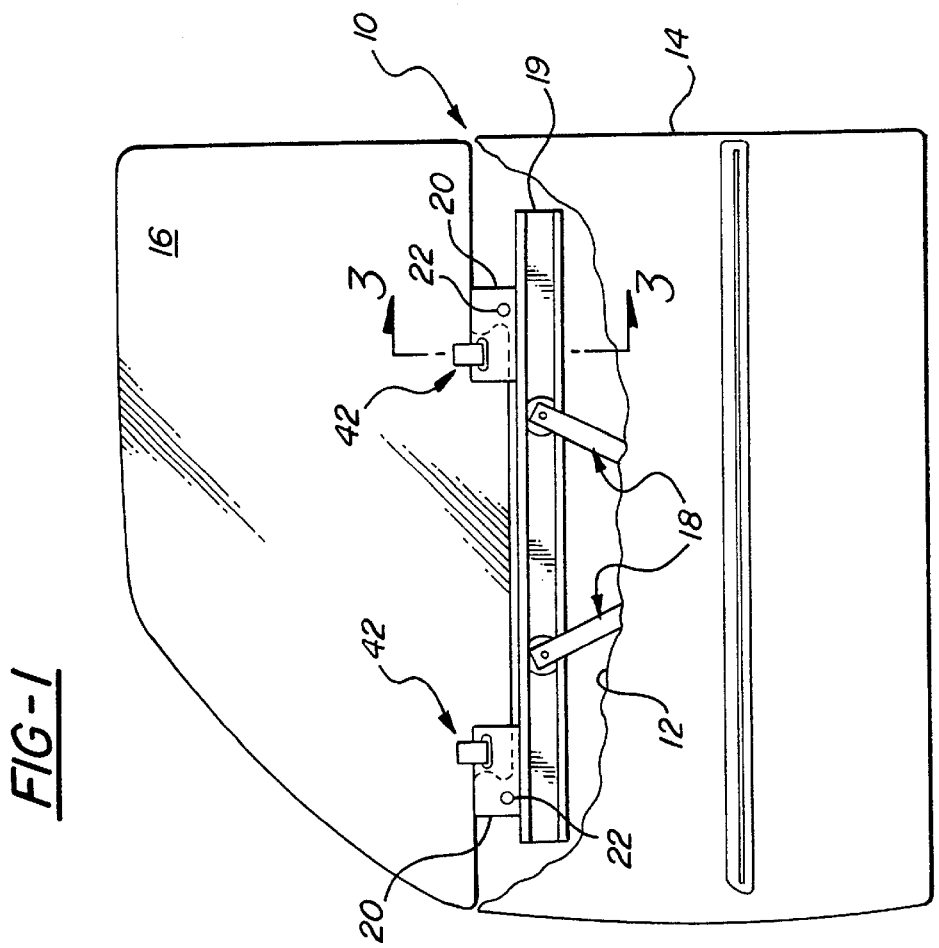
FIG. 1 is a front elevational view of a door window mounting and regulator assembly in accordance with a preferred embodiment of the present invention.

Referring now to the drawings, FIG. 1 illustrates a door window mounting and regulator assembly 10 mounted within a door cavity 12 of a vehicle door 14. The door window mounting and regulator assembly 10 retains a door window glass 16. A window regulator 18 elevates the door window glass 16 from a lowest position within the door cavity 12, whereby the door window glass 16 is concealed, to a highest position within the vehicle door 14, whereby the door window glass 16 completely closes the window opening in the vehicle door 14. The window regulator 18 is also equipped to locate the door window mounting and regulator assembly 10 at any desired position therebetween.

Figure 2:
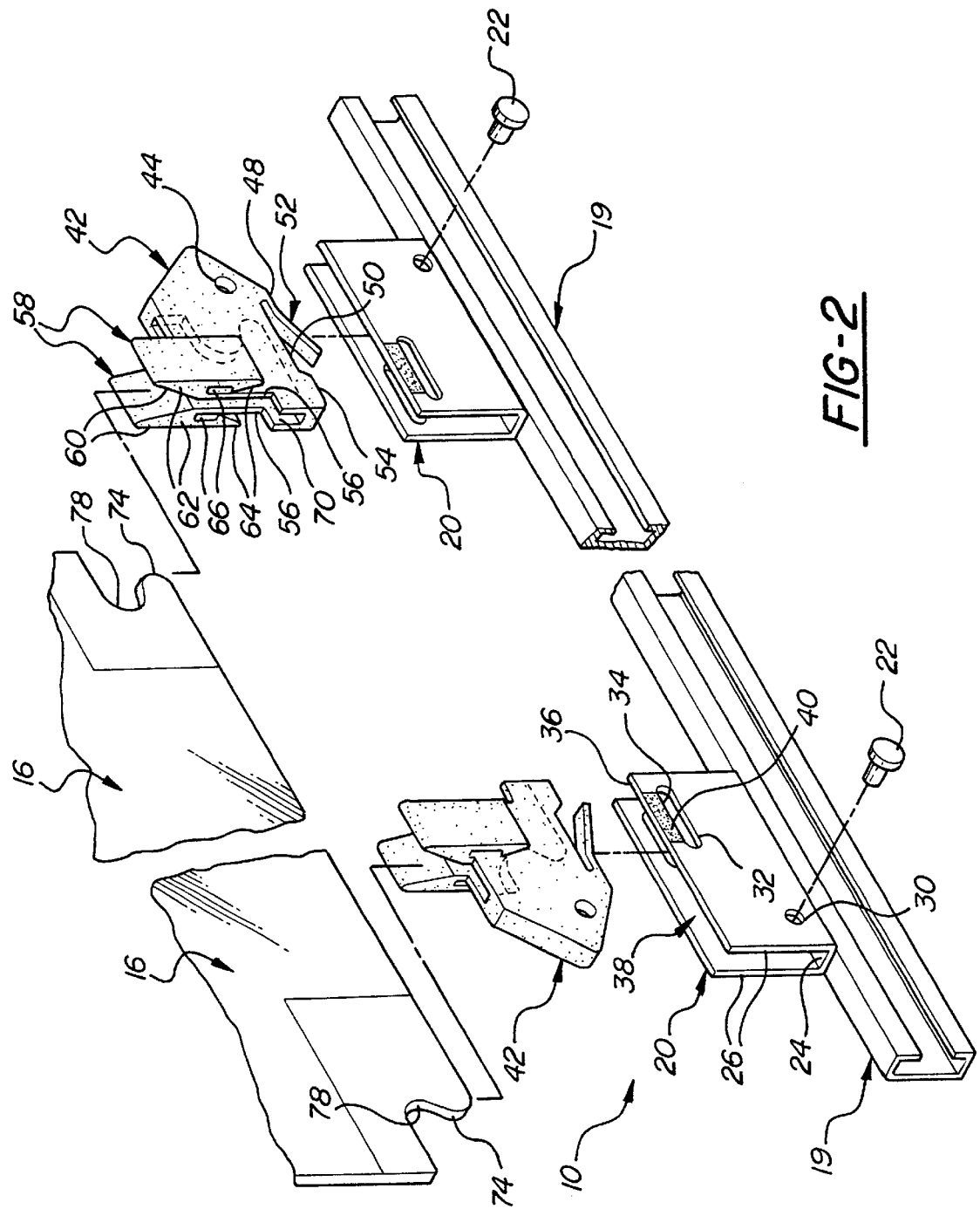
FIG. 2 is an exploded perspective view of the components of the door window mounting and regulator assembly in accordance with the preferred embodiment of the invention.

The door window mounting and regulator assembly 10 utilizes a base member 19 or sash with a pair of clevis brackets 20 mounted thereon in any convenient manner. The clevis brackets 20 each are adapted to receive a retainer bracket 42 therein. The retainer bracket 42 is attached to the clevis bracket 20 by any convenient fastener 22, such as a rivet, such that each retainer bracket 42 pivots bidirectionally in a vertical plane, as illustrated in FIGS. 4 and 5. The pair of retainer brackets 42 pivot upward and in a direction away from each other to achieve an open position. Conversely, the pair of retainer brackets 42 pivots downward and in a direction toward each other to achieve a closed position for a purpose hereinafter described. The retainer brackets 42 each have a spring tab 52 that holds the retainer bracket 42 in the open position for receiving the door window glass 16 as shown in FIG. 2 and more clearly in FIG. 5. Further, each retainer bracket 42 has a pair of cantilevered clasps 58 terminating in a latching member 64 (see FIG. 2) that removably interlocks the retainer bracket 42 within the clevis bracket 20 in a closed position to retain the door window glass 16 within the door window mounting and regulator assembly 10.

FIG. 2 depicts an exploded perspective view of the door window mounting and regulator assembly 10. The base member 19 supports the door window glass 16 of the door window mounting and regulator assembly 10 (shown in FIG. 1). The base member 19 is customarily formed as a C-shaped channel to accommodate the rollers or sliding guides (not shown) associated with a typical window regulator 18, as shown in FIG. 1. As described above, the pair of clevis brackets 20 mount on the base member 19 using any convenient fastening technique. Since the clevis brackets 20 are structurally identical, the components of only one clevis bracket 20 will be described in detail. The preferred embodiment of the present invention contemplates the clevis bracket 20 being welded to the base member 19 such that each clevis bracket 20 is spaced apart from the other.

As shown in FIG. 2, the clevis bracket 20 has an inside bottom surface 24 between a pair of opposed walls 26 extending therefrom. Each wall 26 includes an outer surface 28, an aperture 30, an elongated slot 32 having a peripheral border 34, and an upper surface 36. The walls 26 are spaced apart to define an open area 38 therebetween, opposite the inside bottom surface 24 of each clevis bracket 20. The upper surface 36 and the elongated slot 32 of each wall 26 essentially define an area 40 therebetween for a purpose to be described hereinafter. Each clevis bracket 20 houses a retainer bracket 42. Since each retainer bracket 42 is structurally identical, the components of one retainer bracket 42 will be hereafter described in detail.

Continuing on with FIG. 2, the retainer bracket 42 is located between the pair of walls 26 of the clevis bracket 20 and is pivotably attached thereto. Thus positioned, each retainer bracket 42 mirrors the other. The retainer bracket 42 has an aperture 44 therethrough that aligns with the aperture 30 in each wall 26 of the clevis bracket 20. The fastener 22 removably attaches through the aforementioned aperture 30 of each wall 26 of the clevis bracket 20, and through the aperture 44 of the retainer bracket 42, to pivotably retain the retainer bracket 42 within the walls 26 of the clevis bracket 20. As will be understood by those skilled in the art, the fastener 22 may be a rivet, screw, or any other device that suitably attaches the retainer bracket 42 within the walls 26 of the clevis bracket 20 and allows the retainer bracket 42 to pivot with respect thereto, as described above.

The retainer bracket 42 includes the resilient spring tab 52 which extends from a base surface 48 that forms a recess 50 within the retainer bracket 42 to accommodate the spring tab 52 when the retainer bracket 42 is pivoted in a locked position. The spring tab 52 is an integral part of the retainer bracket 42; however, one skilled in the art will recognize that embodiments other than a unitary construction of the retainer bracket 42 and the spring tab 52 are possible. In an at rest position, the spring tab 52 extends at an angle from the retainer bracket 42 as shown in FIG. 5. Under an external force applied from above as will be hereinafter described, the spring tab 52 locates within the recess 50 of the retainer bracket 42 and stores a biasing force in an upward direction for a purpose to be described hereinafter, as shown in FIG. 4. So positioned, the spring tab 52 rests on the inside bottom surface 24 of the clevis bracket 20.

The retainer bracket 42 has a front tip 54 and a pair of upstanding opposed sidewalls 56. Each sidewall 56 has a resilient cantilevered clasp 58 extending therefrom. Each cantilevered clasp 58 includes a rigid portion 60 and a flexible or resilient end 62 terminating in the latching member 64 (see also FIG. 3). The rigid portion 60 is articulated to the flexible end 62 and forms an internal channel 66 therein. The opposing sidewalls 56 define a slot 70 the width of a window glass for receiving the same. The slot 70 is open-ended at one end and terminates at an opposite end in an undercut contoured surface 72 with an upper contour 76 (shown in FIGS. 4 and 5) for a purpose to be described hereinafter.

In an upward pivoted position as illustrated in FIG. 5 and described hereinafter, the retainer bracket 42, cantilevered clasps 58, and latching member 64 are pivoted upward and are held in an open position due to the force exerted by the spring tab 52 against the inside bottom surface 24 of the clevis bracket 20. Pivoted in this open position, the latching member 64 extends above the upper surface 36 of the clevis bracket 20. The flexible end 62 as well as the latching member 64 is positioned along the sidewall 56 of the retainer bracket 42 (shown in FIG. 3).

Figure 3:
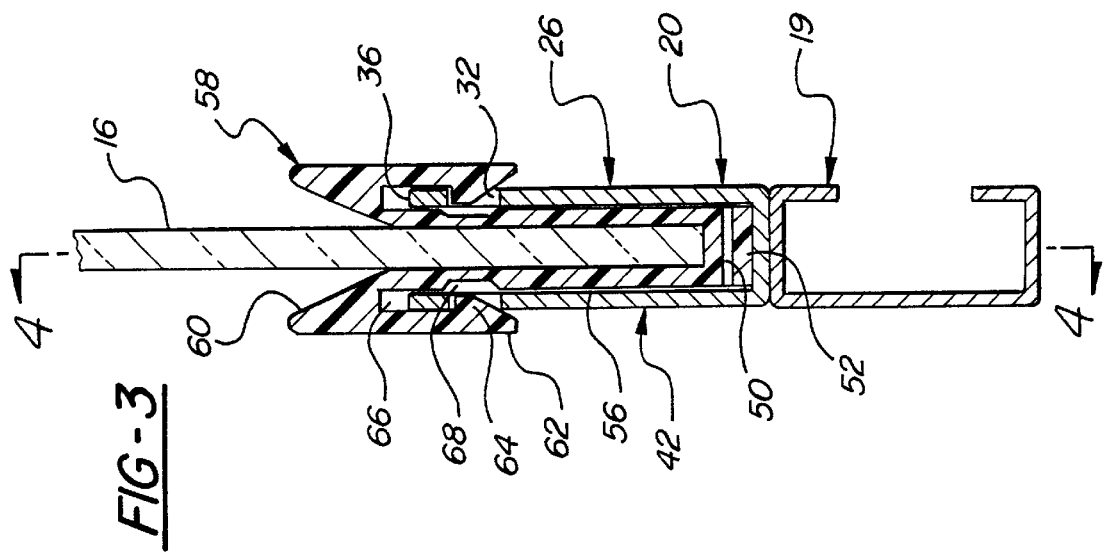
FIG. 3 is a cross-sectional view of the door window mounting and regulator assembly of FIG. 1 taken along line 3—3, showing further structural detail.

In a closed position as depicted in FIG. 3, described hereinafter, each sidewall 56 of each retainer bracket 42 is pivoted within the pair of walls 26 of each clevis bracket 20. Each cantilevered clasp 58 of the retainer bracket 42 extends above the upper surface 36 of the clevis bracket 20. Each cantilevered clasp 58 substantially overlaps the area 40 (shown in FIG. 2) of a respective wall 26, so that as the retainer bracket 42 pivots toward the closed position, the latching members 64 (shown in FIG. 3) snap into the elongated slots 32 of the walls 26 to retain the retainer bracket 42 and thereby the door window glass 16 in a locked position. As will be understood by those skilled in the art, the latching member 64 may be any device that suitably attaches the retainer bracket 42 to the respective clevis bracket 20, as described above.

As shown in FIG. 3, each sidewall 56 has a notch 68 adjacent the elongated slot 32 of the clevis bracket to ensure that the latching member 64 snaps into the elongated slot 32 without interference and is securely maintained in the elongated slot 32, as described above. The latching members 64, as shown in FIG. 5, do not interfere with the surface of the sidewalls 56. This arrangement ensures that the flexible end 62 remains in a non-stressed position. The non-stressed position of the flexible end 62 ensures proper positioning of the latching member 64 within the periphery of the elongated slot 32. Properly located, the latching member 64 locks the retainer bracket 42 within the clevis bracket 20.

As mentioned above and shown in FIG. 2, the pair of sidewalls 56 of each retainer bracket 42 forms the slot 70 therebetween for slidably receiving the door window glass 16. A portion of the bottom of the slot 70 of each retainer bracket 42 is contoured with the undercut contoured surface 72 and the upper contour 76 (shown in hidden lines). With the retainer bracket 42 pivoted in an upward or open position, as shown in FIG. 5, the undercut contoured surface 72 and the upper contour 76 are vertically aligned, as depicted by line A in FIG. 5, to allow an outer contour 74 portion of the bottom of the door window glass 16 to travel downward in the slot 70 toward the inside bottom surface 24 of the clevis bracket 20. As clearly shown in FIGS. 2 and 5, as the downward movement of the glass window continues, both retainer brackets 42 mounted to the clevis bracket 20 begin to pivot about the axis of the fastener 22. As both retainer brackets 42 pivot downwards, the upper contour 76 in the slot 70 pivots clockwise about the outer contour 74 of the door window glass 16 and into an undercut contour 78 on the door window glass 16 to grab the door window glass 16. Since the motion is occurring simultaneously by both retainer brackets 42, the latching members 64 snap into the elongated slots 32 and extend into the notches 68 (shown in FIG. 3) in the sidewalls 56 and the retainer brackets 42 are prevented from further downward travel by the front tip 54 of each retainer bracket 42 bottoming on the inside bottom surface 24 of the respective clevis bracket 20. As shown in FIGS. 3 and 4, the retainer brackets 42 are now securely latched to the clevis brackets 20, and locked therein. In this position, an upward force exerted on the retainer bracket 42 causes the latching member 64 to contact the peripheral border 34 of the elongated slot 32, and thus resist any pivoting about the fastener 22 in an upward direction. A downward force exerted on the retainer bracket 42 causes the front tip 54 to contact the inside bottom surface 24, and thus stops any pivoting about the fastener 22 in a downward direction.

The upper contour 76 of each retainer bracket 42 is positioned above one of the outer contours 74 (as depicted by line B in FIG. 4) of the door window glass 16 to fixedly position and retain the door window glass 16 within the slots 70 (shown in FIG. 2) of each retainer bracket 42.

Positioned as described above, each pair of sidewalls 56 and the upper contour 76 of each retainer bracket 42 effectively encompass one outer contour 74 of the door window glass 16 to permanently, firmly, and fixedly retain the door window glass 16 within each retainer bracket 42 for the service life of the vehicle.

In the closed, locked position as described above and shown in FIG. 3, it can be seen that the retainer bracket 42 is sandwiched within the walls 26 of the clevis bracket 20. The spring tab 52 of the retainer bracket 42 rests on the inside bottom surface 24 of the clevis bracket 20, and tucks into the recess 50 of the retainer bracket 42. The rigid portion 60 and the flexible end 62 of each cantilevered clasp 58 substantially surround the area 40 (shown in FIG. 2) of the wall 26 of the clevis bracket 20, such that the upper surface 36 is positioned within the internal channel 66 of the retainer bracket 42. The latching member 64 extends from the flexible end 62 into the elongated slot 32, under the peripheral border 34 thereof (shown in FIG. 2), and at least partially into the notch 68 in the sidewall 56.

Continuing further, and with reference again to the drawings, particularly FIGS. 4 and 5, a method of removably mounting a door window glass 16 within a door window mounting and regulator assembly 10 is hereinafter described. At the outset of the assembly process, the retainer bracket 42 is pivoted upward and mounted a spaced distance away from the other retainer bracket 42, as shown in FIG. 5. In this open position, the spring tab 52 rests on the inside bottom surface 24 of the clevis bracket 20. The non-stressed spring tab 52 exerts a biasing force on the retainer bracket 42 associated therewith to maintain the retainer bracket in the open position. The sidewalls 56 (shown in FIG. 2) of the retainer bracket 42 and the cantilevered clasps 58 at least partially extend from the open area 38 (shown in FIG. 2) of the clevis bracket 20. Thus the retainer bracket 42 is held in a stationary position pending receipt of the door window glass 16 therein.

In this open position, the upper contour 76 of the slot 70 and the undercut contoured surface 72 of the retainer bracket 42 vertically align to permit the outer contour 74 of the door window glass 16 to slide into the slot 70 (shown in FIG. 2) without interference therefrom. The door window glass 16 inserts along a vertical plane and into the slots 70 of the retainer brackets 42, which are in the open position. As the door window glass 16 is moved downward within the slot 70 and in close contact with the sidewalls 56 (shown in FIG. 2) of the retainer bracket 42, the downward force on the door window glass 16 transfers to each retainer bracket 42 and causes each to pivot about the fastener 22 in a downward direction and toward the clevis bracket 20. The upper contour 76 of each retainer bracket 42 pivots to relocate above the outer contour 74 of the door window glass 16 to lock the door window glass 16 within each retainer bracket 42.

As each cantilevered clasp 58 of the retainer bracket 42 contacts one upper surface 36 of the wall 26 of the clevis bracket 20, the downward force on each retainer bracket 42 causes each flexible end 62 of the cantilevered clasp 58 to flex in a direction away from the rigid portion 60 associated therewith (shown in FIG. 3). Each cantilevered clasp 58 slides over the area 40 (shown in FIG. 2) of the wall 26 and into each respective elongated slot 32 such that the upper surface 36 and the area 40 of the wall 26 are located in the internal channel 66 (shown in FIG. 3) of the cantilevered clasp 58 after the latching member 64 snaps into the elongated slot 32. The resilient forces of the flexible end 62 and the downward force on the retainer bracket 42 cause the flexible end 62 to slidably contact the area 40 (shown in FIG. 2) of the wall 26 until the latching member 64 snaps into the elongated slot 32 and extends into the notch 68 in the sidewall 56 of the retainer bracket 42, locking the retainer bracket 42 into the clevis bracket 20 (as shown in FIG. 3). The pivoting stops when the front tip 54 of the retainer bracket 42 contacts the inside bottom surface 24 of the clevis bracket 20. This completes the one-step assembly process.

Additionally, the present invention contemplates a relatively simple method for detachment and replacement of the door window glass 16 from the door window mounting and regulator assembly 10 for service purposes, as shown in the drawings. An outward force exerted on the flexible end 62 of each cantilevered clasp 58 of the pair of retainer brackets 42, and in a direction away from and perpendicular to the walls 26 associated therewith causes the flexible end 62 to detach from the elongated slot 32 and relocate from its position under the peripheral border 34 of the elongated slot 32. This relocation allows the retainer bracket 42 free movement about the fastener 22.

A force exerted on the door window glass 16 in a direction away from the inside bottom surface 24 causes each outer contour 74 of the door window glass 16 to contact one upper contour 76 of the retainer bracket 42, transferring the force thereto. This force causes the retainer bracket 42 to pivot in an upward direction and away from the other retainer bracket 42. The pivot as described rotates the upper contour 76 in an outward direction consistent with that of the retainer bracket 42 associated therewith, until the upper contour 76 is no longer positioned above the outer contours 74 of the door window glass 16.

As the upward force continues on the door window glass 16, the outer contours 74 of the door window glass 16 slide past the upper contour 76 of the retainer bracket 42 without interference therefrom. The door window glass 16 completely exits the slots 70 of the pair of retainer brackets 42, thereby completing the removal process from the door window mounting and regulator assembly 10. Once the door window glass 16 dislocates from the door window mounting and regulator assembly 10, the pair of retainer brackets 42 remain in an open position, described above and depicted in FIG. 5, to facilitate reception of a replacement door window glass 16 into the door window mounting and regulator assembly 10.

It is clear that the present invention overcomes the problems in the prior art associated with positioning and stabilization via the firm, fixed, permanent positioning of the door window within the door window mounting and regulator assembly. It is also apparent that the present invention readily and easily accomplishes the aforementioned installation and retention of a door window without relying on the various mechanical devices found in the prior art that were subject to imprecise tolerances, malfunction, and the like.

Further, the present invention avoids the use of adhesives as found in the prior art. This eliminates the problems associated therewith; namely, the curing time associated with adhesive, the shift of the door window glass from its designated position during this curing time, disengagement of the door window glass from the window mounting and regulator assembly due to adhesive deterioration, and the inability of the adhesive to affix door windows made from certain materials to a door window mounting and regulator assembly.

Also, the present invention does not use a hole-boring process to effectuate retention of the door window glass within the door window mounting and regulator assembly. It should be not ed that avoidance of use of this process provides a significant improvement over the prior art due to the frangible qualities of door window glass and the high incidence of breakage thereof. Instead, as described above, assembly is accomplished without jeopardizing the structure or condition of the door window glass.

Since the aforementioned process consists of a simple, one-step, substantially vertical motion, it is contemplated that an entirely automated system, such as an assembly line robot, could effectuate the assembly without manual intervention. It is further contemplated that the method previously described substantially streamlines the assembly process of door window glass into the door window mounting and regulator assembly by eliminating time-intensive assembly tasks such as the curing period required with the use of adhesives. Further, this method eliminates multiple-step assembly processes, such as inserting a window in a holder and then bending tabs about the window to ensure retention. It is further contemplated that this method reduces the overall cost of the assembly process with the elimination of the foregoing components, tasks, and steps.

It is also contemplated that the aforementioned removal capabilities facilitate a simple, fast replacement process for the door window glass, this process heretofore unknown in the prior art.

From the above, it can be seen that the present invention provides a stabilized sturdy door window mounting and regulator assembly whereby a door window is firmly, fixedly, and permanently retained therein for the life cycle of the vehicle. Also provided are fast, simple, cost-effective methods for the assembly, removal, or replacement of the door window within or from the door window mounting and regulator assembly. The present invention also achieves firm, fixed, and permanent retention of a door window within a door window mounting and regulator assembly for the life cycle of the vehicle. Further, as described in the aforementioned method of assembly, the present invention achieves this door window mounting and regulator assembly with a simple, one-step, cost effective process.

The aforementioned embodiments and objects are merely illustrative of some possible embodiments and objectives relating to the present invention, but are in no way an exhaustive list of the same. While the invention has been described in terms of a preferred embodiment, it is apparent that one skilled in the art could adopt other embodiments and objects. Accordingly, the present invention is to be limited only by the following claims and their legal equivalents.

What is claimed is:

1. A door window glass mounting assembly adapted to mount a door window glass having a contour therein, said door window glass mounting assembly comprising:
   a base member;
   a pair of clevis brackets mounted on said base member, each clevis bracket of said pair of clevis brackets having a pair of walls extending in a direction away from said base member, each wall of said pair of walls having a first aperture and an elongated slot spaced from said aperture therein;
   a pair of retainer brackets, each retainer bracket of said pair of retainer brackets pivotally connected within one respective clevis bracket of said pair of clevis brackets, each retainer bracket of said pair of retainer brackets further having:
      a base surface;
      a spring tab extending from said base surface;
      a pair of sidewalls extending in a direction away from said base surface, said pair of sidewalls defining a slot therebetween, each sidewall of said pair of sidewalls having:

a cantilevered clasp extending from said sidewall;

means for latching said cantilevered clasp to said elongated slot of a respective wall of said pair of walls of each said respective one of said clevis brackets;

said slot terminating in a bottom surface portion;

an upper contour portion along said bottom surface portion;

an undercut contoured portion adjacent said upper contour portion; and means for fastening each of said pair of retainer brackets to one respective clevis bracket of said pair of clevis brackets.

2. A door window glass mounting assembly adapted to mount a door window glass having a contour therein, said door window glass mounting assembly comprising:

a base member;

a pair of clevis brackets, each clevis bracket of said pair of clevis bracket mounted on said base member, each clevis bracket of said pair of clevis brackets having a pair of walls extending in a direction away from said base member and an elongated slot in each wall of said pair of walls;

a pair of retainer brackets, each retainer bracket of said pair of retainer brackets pivotally connected within said pair of walls of one respective clevis bracket of said pair of clevis brackets, each retainer bracket of said pair of retainer brackets further comprising:

a pair of sidewalls defining a slot therebetween, said slot terminating in a bottom surface having an upper contour portion;

a pair of latching members extending in a direction away from said base member; and means for pivoting each retainer bracket of said pair of retainer brackets with respect to one respective clevis bracket of said pair of clevis brackets.

3. The door window mounting and regulator assembly according to claim 2 wherein each of said means for pivoting pivotally attaches one respective retainer bracket of said pair of retainer brackets within one respective clevis bracket of said pair of clevis brackets.

4. The door window mounting and regulator assembly according to claim 2 wherein:

each sidewall of said pair of sidewalls of each clevis bracket of said pair of clevis brackets has a first aperture therein;

each retainer bracket of said pair of retainer brackets has a second aperture therein; and said door window mounting and regulator assembly further comprising a pair of fasteners, each fastener of said pair of fasteners adapted to be inserted through one respective first aperture of one respective wall of one respective clevis bracket of said pair of clevis brackets and one respective second aperture of each retainer bracket of said pair of retainer brackets.

5. The door window mounting and regulator assembly of claim 2 further comprising a spring tab extending from each retainer bracket of said pair of retainer brackets for positioning each retainer bracket of said pair of retainer brackets in an open position.

6. The door window mounting and regulator assembly of claim 2 wherein each latching member of said pair of latching members further comprises:

a resilient end; and a latching portion for respectively latching each latching member of said pair of latching members to said elongated slot in each wall of said pair of walls of each clevis bracket of said pair of clevis brackets.

7. A door window mounting and regulator assembly for fixedly retaining a door window, said door window mounting and regulator assembly comprising:

a base member;

a pair of clevis brackets mounted on said base member;

a pair of retainer brackets, each retainer bracket of said pair of retainer brackets pivotally connected within one respective clevis bracket of said pair of clevis brackets;

means for retaining said door window within said pair of retainer brackets; and means for latching each retainer bracket of said pair of retainer brackets to one respective clevis bracket of said pair of clevis brackets.

8. The door window mounting and regulator assembly according to claim 7 wherein said door window comprises at least one contour, said at least one contour cooperating with said latching means.

9. The door window mounting and regulator assembly according to claim 7 wherein each clevis bracket of said pair of clevis brackets further comprises a pair of walls, each wall of said pair of walls having an elongated slot therein whereby said means for latching respectively attaches each retainer bracket of said pair of retainer brackets to said elongated slot of one respective clevis bracket of said pair of clevis brackets.

10. The door window mounting and regulator assembly according to claim 7 wherein each retainer bracket of said pair of retainer brackets further comprises a spring tab extending therefrom for locating and positioning said pair of retainer brackets in an open position.

11. A mounting assembly for fixedly retaining a door window glass having a contour therein, said mounting assembly comprising:

a base member;

means, mounted to said base member, for receiving and guiding said door window glass;

means for pivoting said receiving and guiding means, said pivoting means attached to said base member and positioned between said receiving and guiding means and said base member, said pivoting means having a contour portion thereon, such that as said pivoting means pivots said receiving and guiding means from one end of travel position to an opposite end of travel position, said contour of said door window glass interlocks with said contour portion of said pivoting means, whereby upon receiving said door window glass in said receiving and guiding means as said door window glass is moved from a first unlocked position towards a second locked position, said door window glass movement causes said pivoting means to pivot from one end of travel position to interlock said contour of said door window glass with said contour portion of said pivoting means to an opposite end of travel position so as to securely lock said door window glass to said base member; and means for mounting said means for pivoting to said base member.

12. The mounting assembly according to claim 11 wherein said pivoting means further comprises a pair of clevis brackets, said pair of clevis brackets mounted on said base member such that there is a spaced distance between each clevis bracket of said pair of clevis brackets.

13. The mounting assembly according to claim 12 wherein each clevis bracket of said pair of clevis brackets has an elongated slot therein and further wherein said pivoting means latches within each elongated slot of each clevis bracket of said pair of clevis brackets for removably locking said pivoting means within one respective clevis bracket of said pair of clevis brackets.

14. The mounting assembly according to claim 11 wherein said receiving and guiding means further comprises a pair of opposed walls extending from said means for pivoting.

15. The mounting assembly according to claim 11 wherein said receiving and guiding means further comprises a pair of clevis brackets mounted on said base member in a spaced relation to each other and wherein said pivoting means further comprises a pair of retainer brackets, each retainer bracket of said pair of retainer brackets pivotally attached by said pivoting means within one respective clevis bracket of said pair of clevis brackets.

16. A method for attaching a window to a window regulator assembly, said window having a contour therein, said method comprising the steps of:

positioning a means for pivoting on a base member attached to said window regulator assembly;

moving said window along a path of travel to position said window in a means for receiving and guiding defined by two opposing walls attached to said means for pivoting; and continuing moving said window along said path of travel to cause said means for pivoting to pivot about an attachment point on said window regulator assembly from a first at rest position to a second locked position whereby said contour of said window interlocks with a contour on said means for pivoting such that a resilient latch on said means for pivoting securely locks said window to said window regulator assembly.

17. A device for mounting a window thereto, said device comprising:

a base member;

means for retaining and engaging said window spaced from said base member;

means for supporting said means for retaining and engaging said window, said support means positioned between said base member and said means for retaining and engaging, said means for supporting having means for pivoting said retaining and engaging means such that when said means for retaining and engaging is attached to said means for supporting about said means for pivoting said means for retaining and engaging pivots with respect to said means for supporting; and means for latching said means for retaining and engaging to said means for supporting, said means for latching interposed said means for retaining and engaging and said window.

18. The device as claimed in claim 17 wherein said window has an engagement surface thereon, and further wherein said means for retaining and engaging comprises a retainer bracket having a complementary engagement surface thereon for communicating with said engagement surface of said window.

19. The device as claimed in claim 18 wherein said means for supporting comprises a clevis bracket portion having sidewalls extending away from said base member, and further wherein said means for pivoting comprises a pin member extending through said sidewalls of said clevis bracket portion and said means for retaining and engaging, said means for retaining and engaging being pivotable about said pin member.

20. The device as claimed in claim 19 wherein said means for latching comprises:

an interlocking groove in at least one of said sidewalls of said clevis bracket portion; and an interlocking member on said retainer bracket that interlocks with said interlocking groove of said clevis bracket portion.

21. The device as claimed in claim 20 further comprising means for biasing said retainer bracket in an open position, said means for biasing being positioned between said retainer bracket and said base member.

22. The device as claimed in claim 21 wherein said window engages said retainer bracket such that said engagement features engage one another, said retainer bracket pivots toward said base member while carrying said window, and said interlocking features interlock with one another to retain said window within said device.

* * * * *